J. V. ERRICKSON.
METHOD OF AND APPARATUS FOR MAKING PHONOGRAPH RECORDS.
APPLICATION FILED JULY 3, 1918.

1,307,812.

Patented June 24, 1919.

Inventor
John V. Errickson
by Wm. Stull Jackson
Attorney

J. V. ERRICKSON.
METHOD OF AND APPARATUS FOR MAKING PHONOGRAPH RECORDS.
APPLICATION FILED JULY 3, 1918.
1,307,812.
Patented June 24, 1919.
3 SHEETS—SHEET 2.
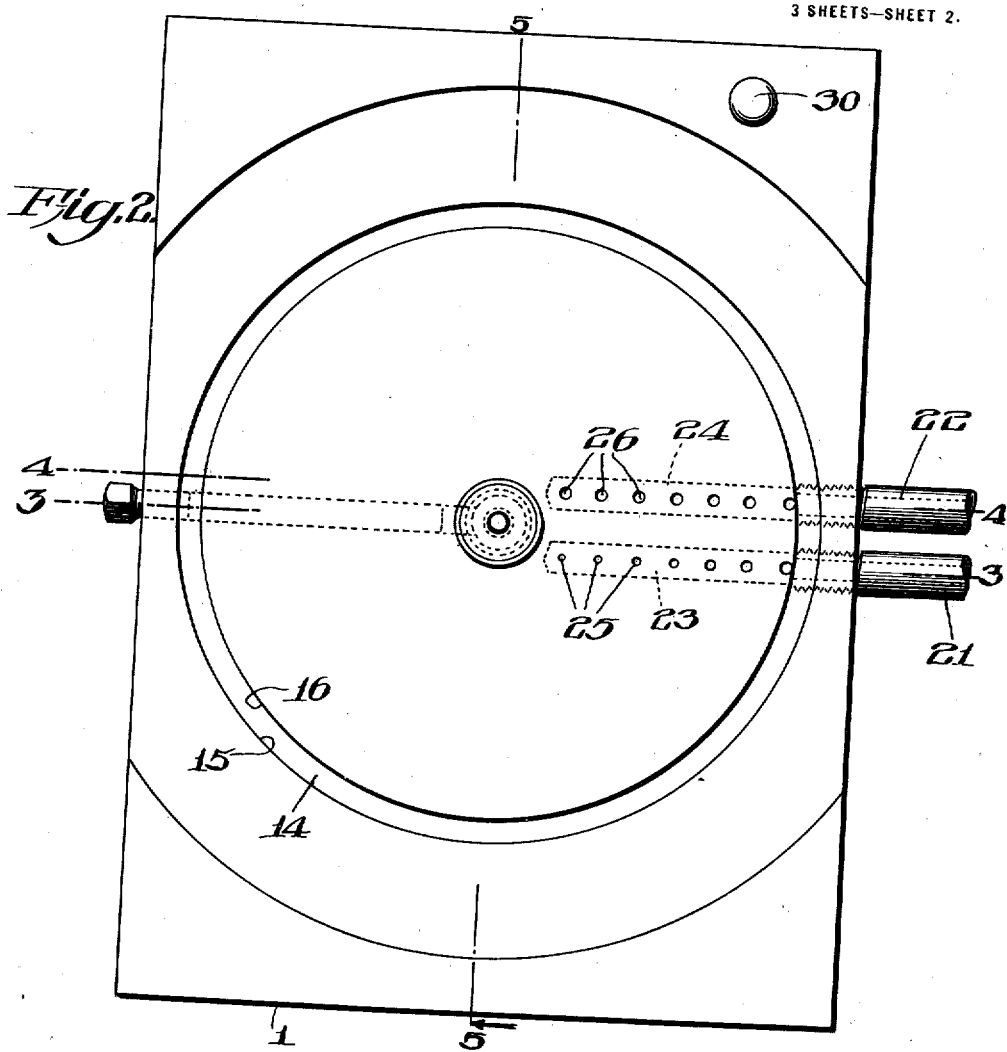
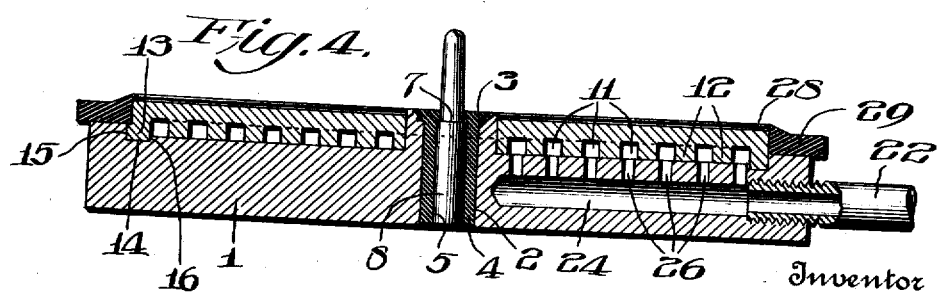
Inventor
John V. Errickson
by Wm Steell Jackson
Attorney J. V. ERRICKSON.
METHOD OF AND APPARATUS FOR MAKING PHONOGRAPH RECORDS.
APPLICATION FILED JULY 3, 1918.
1,307,812.
Patented June 24, 1919.
3 SHEETS—SHEET 3.
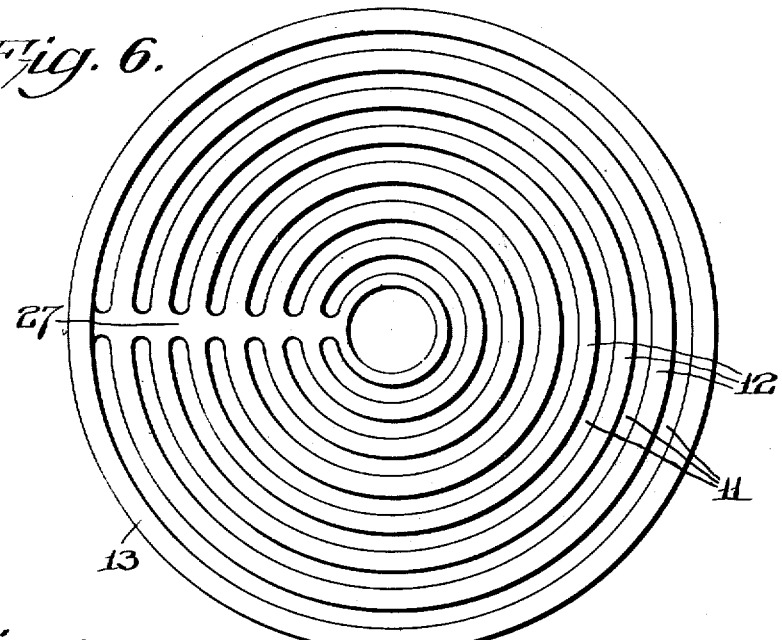
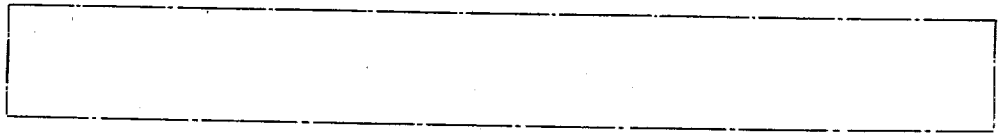
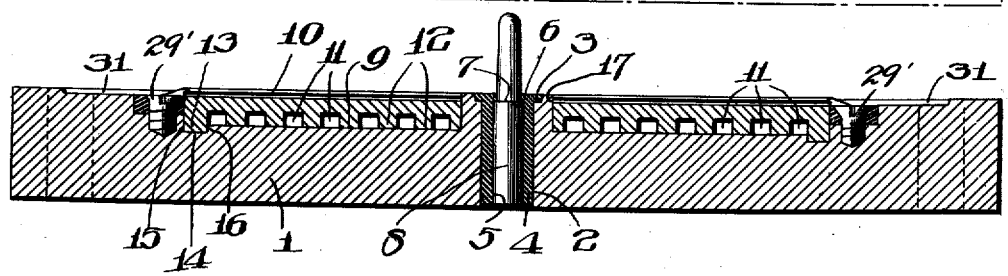
Inventor
John V. Errickson
by
Attorney

UNITED STATES PATENT OFFICE.

JOHN V. ERRICKSON, OF SCRANTON, PENNSYLVANIA.

METHOD OF AND APPARATUS FOR MAKING PHONOGRAPH-RECORDS.

1,307,812.   Specification of Letters Patent.   Patented June 24, 1919.

Application filed July 3, 1918. Serial No. 243,131.

*To all whom it may concern:*

Be it known that I, JOHN V. ERRICKSON, a citizen of the United States, residing at Scranton, in the county of Lackawanna and State of Pennsylvania, have invented a certain new and useful Method of and Apparatus for Making Phonograph - Records, of which the following is a specification.

My invention relates to the dies for forming phonograph records from a hot plastic mass and cooling the records to set them before they are released from the dies. It is concerned with the method used and the dies by which the method is carried out.

The purpose which I have in view is to adapt the dies for more rapid and uniform heating and cooling than has heretofore been possible.

A further purpose is to place the heating and cooling ducts as close as possible to the surface of the die.

A further purpose is to graduate the inlets for the heating and cooling fluids, proportioning them according to the extents of surface heated and cooled.

A further purpose is to save in the quantity of steam and water required to heat and cool the dies.

A further purpose is to provide the die parallel to the plane of the die, forming the channels for fluid in one or both of the faces thus exposed by the division and to seal against leakage by insetting the material of one of the divided parts within the other.

A further purpose is to dish or concave the dies at the center to distribute the plastic mass uniformly in the finished die.

A further purpose is to ease away the dies at the outer edge to facilitate the flow of the plastic material along the edge in order to secure uniform record thickness.

A further purpose is to utilize a thin metal matrix without backing, placing the same directly against the body of the die.

Further purposes will appear in the specification and in the claims thereof.

I have preferred to illustrate my invention by but one embodiment thereof, selecting a form which has proved to be practical, highly efficient and very economical in operation and which at the same time well illustrates the principles of my invention.

Fig. 2 is a top plan view of the same construction but without the channel disk and retaining ring.

Figure 1:
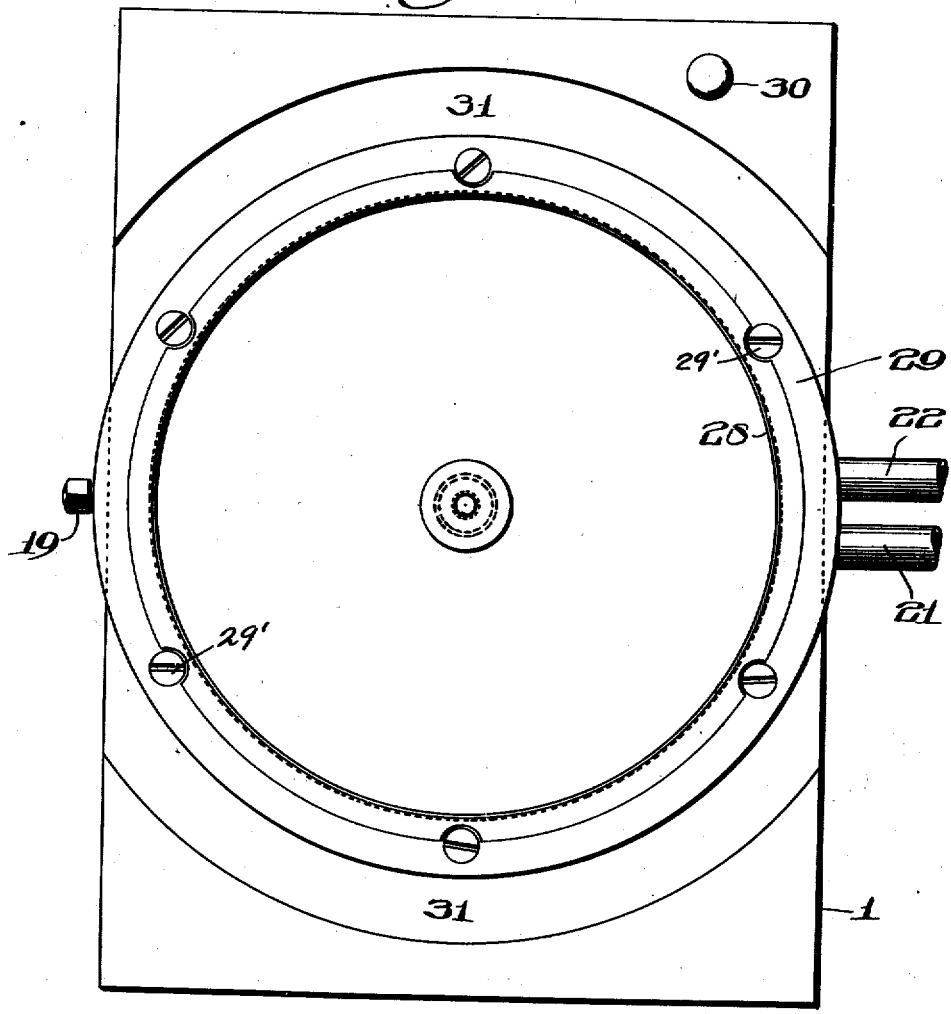
Figure 1 is a top plan view of the lower die of the preferred form of my invention.
Figure 3:
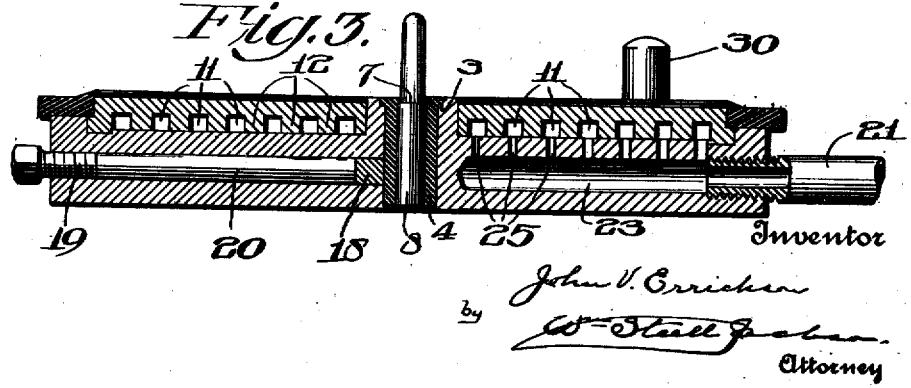

Figs. 3 and 4 are vertical sections of the same die in positions indicated by section lines 3—3 and 4—4 in Fig. 2 but with the channel disk and retaining ring in position.

Fig. 5 is a section corresponding to line 5—5 of Fig. 2 but with the channel disk and retaining ring in position and the upper die in dotted position above it.

Fig. 6 is a bottom plan view of the channel ring shown in the other figures.

Fig. 7 is the diagrammatic view showing the sloping of the faces of the upper and lower dies on an enlarged scale.

In the drawings similar numerals indicate like parts.

In the manufacture of phonograph records it is customary to place the mass of hot, plastic record material upon the surface of a thin copper disk matrix which is backed by soft metal and rests upon the lower of two heated dies of appropriate size, squeeze the mass between this matrix and a correspondingly backed matrix against the upper of the two dies until the record has been formed, and immediately cool the dies to harden the record material so as to permit its removal from the dies.

The repetition of these operations requires that the dies be quickly and uniformly heated and cooled for each impression, involving many hundreds of cycles with as short intervals as possible. The heating is done by steam and the cooling by cold water. The time element involved of course directly affects the labor cost for manufacture and the quantity of steam and water used have represented items of considerable expense. My invention is designed to save in both of these as well as secure a more uniform and desirable product.

My upper and lower dies are substantially alike except that the lower die is provided with a pin at the center fitting within a recess in the upper die. A description of the lower die with a general statement of the relation between them will therefore be sufficient explanation of both. Both dies are made of steel because of the many tons of pressure used in operating the dies.

The body 1 of the die is provided with a central opening 2 counter-sunk at 3 to receive a collar 4 having a chambered opening 5 therein. The opening is reduced in diameter at the upper end to form a shoulder 6. This engages a corresponding shoulder 7 of a pin 8, whose upper end projects above the rest of the die structure, defines the central hole in the finished record and fits into a corresponding opening, not shown, in the upper die.

My invention contemplates locating the heating and cooling channels as close to the working faces of the dies as possible. In order to do this I cut out a portion of the center of the die annularly to some such plane as 9 and thus have opportunity to cut the distributing channels in either the upper die portion which is inset to take the place cut away or in the body of the die or to divide them between the two. I prefer to cut the channels 11 in the upper part or die face member, which for convenience I call the channel disk, rather than to have this form a cover plate only or take but a part of the channels or of the channel depth.

Cutting the channels in the channel disk offers an advantage in sealing because the disk is stiffened by the intervening ribs 12 and the outer rib may be extended or a corresponding rib may be formed in a preferably stiffened disk, as at 13, to fit into a groove 14 in the outer side of the body of the die. By making this rib thicker than the groove is wide and forcing the rib down into the groove by heavy pressure neither expansion nor contraction of the disk with respect to the die body will cause leakage about this edge, expansion of either with respect to the other will tighten the contact between the depending rib of the disk and the body at one or other of the engaging edge surfaces 15 and 16.

The disk is sealed at the center against leakage of steam and water and intrusion of plastic record material between it and the die body, by providing the body with a circular boss or hub 17 upon which the disk is fitted tightly, the disk being initially slightly smaller than the boss.

In this manner I provide a complete seal of the disk within and against the body of the die. The construction and method shown have in practice proved to be so successful that the disk and body have proved effective in use as if they were integral.

The thimble or collar 4 is shown as held in place by a plug 18 which is pressed to position by a set screw 19 bearing upon an intermediate rod 20.

Inlet and outlet of the steam and cold water to the channels are provided for by inlet pipe 21 and exhaust pipe 22 connecting with an automatic valve, so that the steam is shut off at the same time the water is applied, and vice versa. I have not considered it necessary to show this valve as the form of the valve does not constitute any part of the present invention and such valves (generically) are well known.

The inlet and outlet pipes connect with passages 23 and 24 which communicate with successive channels by drilled holes 25 and 26. The exact size of the exhaust holes is not material as they may all be made large enough to properly exhaust from any of the channels, but the inlet openings 25 should be proportioned to the quantity of steam which each channel requires to raise the disk to the same temperature throughout its surface. This will be all right also for the water required to cool the disk. I have found in practice that the needs of the several channels closely approximate their theoretic needs so that the area of the several openings will approximately vary with the length of the channel and hence with the diameter upon which it is cut. I have found also that I get very satisfactory results with an equal spacing of the channels along the radius of the disk and that the short distance at 27 between the inlet and outlet ends of the channel makes substantially no difference in the uniformity of the heating about the surface of the die.

Either single or double records can be made. For a single record one die only will carry a matrix, the other being plain. As this invention is suitable for either, I will describe it in connection with double record manufacture.

Each of the dies carries a thin copper sheet comprising the matrix so that records are impressed upon the upper and lower surfaces of the disk at the same time. Whereas the previous practice has been to stiffen the electrotyped copper matrix by a backing, usually of lead but sometimes of other materials, including a proposal to give additional thickness of copper to provide this stiffness, so that the backing shall have the strength required for the insecure holding means previously used, I avoid all necessity for stiffening by an efficient clamp which at the same time protects from intrusion of record material and am enabled to use what would be considered in the art as a "thin" matrix such as is now furnished to record makers for backing. It is smooth on one side, and containing the reversed record upon the opposite side, is clamped upon the top of the channel disk by the over-hanging flange 28 of a ring 29, also in center by the bevel on pin 4. The ring is held in place by screws 29'. By the use of the thin matrix without the customary backing, I make the matrix much more sensitive to changes in die temperature, reducing the total heat and cooling agents required and effecting a decided saving in time.

The bodies of the dies are extended to provide a place for any desired number of guide pins 30 but the material of the body is preferably recessed as at 31 where it extends beyond the edge of the ring, in order to give clearance room for the extrusion of any excess material which may have been provided for the record.

I have discovered that smoothness and evenness of flow and distribution of the material for the record are facilitated by dishing the inner parts of the effective die faces to give more space between them near the center than at a point near the edges. This is indicated by the lines 32 and 33 which show the enlarged contours of each half of the facing dies. The scale is disproportionate, exaggerating the difference in spacing between the top and bottom dies. For a construction found to be desirable the parallel lines at 34 are intended to be spaced a thousandth of an inch, whereas the length of the figure is but slightly more than three times the radius of the channel disk.

The effective faces of the two dies are also desirably cut away near the outer edges as at 35 and 36 so that they approach each other most closely along some such circles as at 37 and 38. I find that this configuration secures very satisfactory distribution of the plastic record material, improving the homogeneity of the product and giving uniformity of thickness in the finished phonograph record.

It will be obvious that many changes could be made from the form of invention I show while securing a part at least of my invention, utilizing the principles upon which it is based; and I desire to protect all such changes or modifications as fall fairly within my claims in view of the disclosure made herein; considering that my explanation will enable those skilled in the art to see many other ways in which the invention may be applied and whose desirability may depend upon specific application to different problems, upon the character of material which is being worked or upon the article which is being made.

It will be evident also that other articles than phonograph records can be made by the application of my invention and that a series of such articles can be made by two dies, each carrying a number of duplicates of the impression desired, all being heated and cooled by fluids in the same channels.

It will be further evident that the need for uniformity of distribution of the hot and cold fluids throughout the dies will depend upon the character of the product as well as the material from which it is being formed and that smaller objects and objects of less exact ultimate requirement can be taken care of by longitudinally disposed channels extending through a number of smaller effective die faces.

In operation the several matrices are placed in position on the dies and a label is applied over the pin on the lower die. Steam is turned into the passages and a sufficient quantity of hot plastic record material is placed upon the lower die. The press is then operated and this material is squeezed into the record form. While it is held in that position the steam is turned off and cold water is forced through the passages in the die, hardening the record material into a record. As the edge of the flange 29 cuts off any excess of material, the record is substantially finished in this condition.

The rapidity and uniformity with which the entire die can be successfully heated and cooled has been found to greatly increase the number of records which can be pressed per hour and the die stands up splendidly to the work notwithstanding the speed attained.

Inasmuch as the heating is from the upper surface, close to the matrix, the die is ready for use before the entire die body has been heated and the cooling effect becomes operative upon the matrix before the balance of the die body has been fully cooled, effecting a great saving in time and in the quantity of steam and cold water used.

Further, the distribution of steam and water through passages close to the matrix surface cause a large contact surface for heating and cooling close to the matrix, again improving the speed of operation.

For convenience in wording of the claims, I have used the word "flexible" in several of the claims, to indicate a thin material, such as is obtained by electro-deposit, substantially free from backing material.

Having thus described my invention what I claim as new, and desire to secure by Letters Patent is:

1. The process of handling hot plastic material between dies to secure a product of a given uniform thickness which consists in pressing the material relatively thicker near the middle than the proportionate thickness of the middle of the product sought.

2. The process of handling hot plastic material between dies to produce a given thickness of finished product which consists in molding the material relatively thinner at the outer edges than the proportionate thickness of the outer edges of the finished product.

3. The process of handling hot plastic material between dies to secure uniform thickness of a product which consists in molding the material thinner in proximity to the outer edge than inside this point.

4. The process of handling hot, plastic material between dies to secure uniform thickness of the product which consists in molding the material thinner at an intermediate zone between the center and the rim, but a considerable distance inside the rim than inside and outside this zone.

5. The process of facilitating the uniform distribution of hot plastic material for die formation of phonograph records which consists in giving more room for material during the molding throughout one circumferentially-extending zone than another such zone, to secure uniform thickness in the product.

6. The process of forming phonograph disks of uniform thickness from hot plastic material which consists in giving more room for the material during the pressing operation near the middle and near the outer circumference of the intended disks.

7. The process of heating and cooling a die for hot plastic material which consists in passing heating and cooling fluids alternately and in multiple paths through the die close to the surface along well defined lines of flow of relatively small cross section at substantially uniform distances apart.

8. The process of facilitating heating and cooling of a hot plastic material into disks which consists in supplying the heating and cooling fluids each concurrently through separate paths distributed at substantially uniform distances close to the surface of the material.

9. The process of heating and cooling a flat die for handling hot plastic phonograph record material which consists in forming a plurality of circularly arranged channels close to each other and to the die surface for the passage of the fluids and supplying each of the fluids thereto concurrently.

10. The process of heating and cooling dies for manufacture of phonograph records from hot plastic material which consists in providing circularly arranged passages, substantially uniformly spaced, close to the surface of the die and having inlet and outlet openings, in proportioning the inlet openings approximately to the lengths of the several passages and in supplying heating and cooling fluids alternately thereto concurrently to all of the passages.

11. The process of facilitating the heating and cooling of the matrices for phonograph records which consists in utilizing a thin metal matrix and securing it directly against the die by which it is to be pressed against the material handled, protecting the outer edges against intrusion of record material by the retaining means.

12. The process of facilitating the heating and cooling of a matrix for molding hot plastic material into phonograph dies, which consists in utilizing an unbacked metal matrix and securing it in intimate contact with a die adapted to be heated and cooled for pressing and chilling the phonograph material.

13. A phonograph die having its surface sloping away from the plane of the face near the outer edge of the matrix holding portion of the die.

14. A phonograph die having its greatest record-forming projection along a section near but at a distance from the outer edge of the die.

15. A phonograph die for pressing hot plastic material comprising a die body and channel disk interfitting therewith provided with a plurality of annular channels in one of the parts on their facing side and inlet and outlet fluid supply and discharge provision connecting with all of the channels.

16. In a phonograph die, a die body and channel disk interfitting therewith, one of the parts being annularly channeled concentrically and the other providing inlet and outlet passages both connecting therewith at different distances from the center.

17. In a phonograph die, a die body and channel disk interfitting therewith, one of the parts being annularly channeled and the other providing channel inlets of variant size.

18. A disk die for pressing hot plastic material divided in two parts along a plane parallel to the face of the die, having circular spaced channels formed in the facing side of one of the parts, separate inlet and outlet fluid connections for said channels and a fluid-tight seal between the parts.

19. In a phonograph die for pressing hot plastic material, a die body recessed throughout the face thereof, a facing therefor fitting the recess, one of the two parts being provided with substantially uniformly spaced channels, and inlet and outlet fluid connections therefor, in combination with a rib upon one of the parts fitting into a groove in the other to form a fluid-tight seal therebetween.

20. A phonograph die comprising a die body having inlet and outlet fluid connections and an annular recess in its face, a channel disk fitting the recess and having a projecting rib tightly fitting into a groove in the die body to form a fluid-tight seal therewith and circular ribs upon the channel disk forming channels between at substantially uniform intervals communicating with both fluid connections.

21. A phonograph die comprising a die body having an annular recess in its face and a circularly grooved channel disk fitting the recess and having a projecting rib tightly fitting into a groove in the die body and forming a fluid-tight seal therewith, the body being provided with inlet openings into the grooves graduated to suit the lengths of the grooves and with outlet openings therefor.

22. A phonograph matrix of thin flexible metal, in combination with a die adapted to be heated and cooled and means for clamping the thin metal matrix in intimate contact with the die and protecting the outer edge from intrusion of record material by the clamping means.

23. A phonograph matrix of thin flexible material, in combination with a die adapted to be heated and cooled and means for clamping the matrix in intimate contact with the die and protecting the outer edge from intrusion of record material beneath it by the clamping means.

24. As an article of manufacture, a complete phonograph record matrix formed of thin sheet metal and free from backing.

JOHN V. ERRICKSON.

DISCLAIMER.

1,307,812. *John V. Errickson*, Scranton, Pa. METHOD OF AND APPARATUS FOR MAKING PHONOGRAPH RECORDS. Patent dated June 24, 1919. Disclaimer filed June 6, 1923, by the assignee *Columbia Graphophone Manufacturing Company*.

Hereby enters this disclaimer to the claims in said specification, which are in the following words, to wit:

"7. The process of heating and cooling a die for hot plastic material which consists in passing heating and cooling fluids alternately and in multiple paths through the die close to the surface along well defined lines of flow of relatively small cross-section at substantially uniform distances apart.

"8. The process of facilitating heating and cooling of a hot plastic material into disks which consists in supplying the heating and cooling fluids each concurrently through separate paths distributed at substantially uniform distances close to the surface of the material.

"9. The process of heating and cooling a flat die for handling hot plastic phonograph record material which consists in forming a plurality of circularly arranged channels close to each other and to the die surface for the passage of the fluids and supplying each of the fluids thereto concurrently.

"15. A phonograph die for pressing hot plastic material comprising a die body and channel disk interfitting therewith provided with a plurality of annular channels in one of the parts on their facing side and inlet and outlet fluid supply and discharge provision connecting with all of the channels.

"16. In a phonograph die, a die body and channel disk interfitting therewith one of the parts being annularly channeled concentrically and the other providing inlet and outlet passages both connecting therewith at different distances from the center.

"18. A disk die for pressing hot plastic material divided into two parts along a plane parallel to the face of the die, having circular spaced channels formed in the facing side of one of the parts, separate inlet and outlet fluid connections for said channels, and a fluid tight seal between the parts."

[*Official Gazette July 3, 1923.*]